US008113109B2

(12) United States Patent
Duran

(10) Patent No.: US 8,113,109 B2
(45) Date of Patent: Feb. 14, 2012

(54) MACHINE FOR HEAT EXCHANGE WITH A PRODUCT

(75) Inventor: Jesus Pagan Duran, Murcia (ES)

(73) Assignee: Aurum Foods, S.L. (ES)

( * ) Notice: Subject to any disclaimer, the term of this patent is extended or adjusted under 35 U.S.C. 154(b) by 421 days.

(21) Appl. No.: 12/394,156

(22) Filed: Feb. 27, 2009

(65) Prior Publication Data

US 2009/0236082 A1    Sep. 24, 2009

(30) Foreign Application Priority Data

Mar. 18, 2008  (ES) .................................. 200800796

(51) Int. Cl.
*A23L 3/18*    (2006.01)
*F28D 11/02*   (2006.01)
(52) U.S. Cl. ................. 99/470; 165/88; 165/91; 62/354
(58) Field of Classification Search .................... 99/455, 99/470; 165/86–91, 94, 95; 62/354
See application file for complete search history.

(56) References Cited

U.S. PATENT DOCUMENTS

| | | | | |
|---|---|---|---|---|
| 2,054,841 A | * | 9/1936 | Taylor | 62/354 |
| 4,271,682 A | * | 6/1981 | Seki | 62/354 |
| 4,558,733 A | * | 12/1985 | Lindroos | 165/94 |
| 4,892,033 A | * | 1/1990 | Sollich | 99/455 |
| 5,078,204 A | * | 1/1992 | Loffredo et al. | 165/89 |
| 5,964,278 A | * | 10/1999 | Langoy et al. | 165/87 |
| 6,238,524 B1 | * | 5/2001 | Zebuhr | 202/185.1 |
| 6,241,377 B1 | * | 6/2001 | Heyde | 366/147 |
| 6,531,172 B2 | * | 3/2003 | Perrine | 426/467 |

FOREIGN PATENT DOCUMENTS

ES          291930          4/1987
* cited by examiner

*Primary Examiner* — William Pierce
(74) *Attorney, Agent, or Firm* — Cantor Colburn LLP

(57) ABSTRACT

The present invention relates to a machine for heat exchange with a product including a vat, with a first end, a second end and an outer surface, for containing the product to be treated, a shaft, at least one element for heating or cooling a product and for being coupled in the shaft and at least one scraper blade. The machine for heat exchange with a product additionally includes a plurality of separators configured to be coupled in the shaft, at least one separator being located between two contiguous elements. Between two contiguous elements there may be located inner scraper blades anchored in structures fixed to the shaft of the machine at their ends, which in their rotation movement will scrape the outer surfaces of the elements and separators. Additionally, outer scraper blades may be arranged between the structures and the vat to scrape the inner surface of said vat.

12 Claims, 8 Drawing Sheets

MACHINE FOR HEAT EXCHANGE WITH A PRODUCT

FIELD OF THE INVENTION

The present invention belongs to the field of the machines designed for heat exchange with a product. Said heat exchange includes either heating, cooling or drying processes, for example. The products may be both foods, in a preferred embodiment, and any other type of product which must be heated or cooled such as sludge from waste water treatment plant. More particularly, the present invention relates to a vat provided with different elements for cooling or heating the product such that the ratio between the surface of the elements and the volume of the vat is maximal, thus simulating non-industrial cooking in the case of treatment of foods.

BACKGROUND OF THE INVENTION

Spanish utility model ES 0291930 U is known, which relates to a device for continuously cooling or heating for fluid or pasty products. This device is formed by three concentric vessels closed at one of their bases and opened at the opposite base, a rotating disk being located in the open part from which there emerge multiple arms to which scraper blades for scraping the walls are secured.

A cooling or heating fluid is introduced between the walls of the three vessels for thermally conditioning the fluid or paste placed therein. The entrance and exit of the product is carried out from the face to which the three vessels are joined and flows from the inner storage tank until its exit from the outer storage tank.

The difficulty of said apparatus lies on the one hand in that the chambers through which the product passes do not have the same dimensions or capacity, whereby the residence time of the product in them is variable, making it difficult to perform the heating or cooling calculation thereof. The capacity of the apparatus is quite limited, since it increases proportionally to the diameter of the apparatus, being able to result in a storage tank with large dimensions.

The product adheres to the walls of the vessels as the wearing of the scraper blades occurs, whereby heat transmission and therefore the cooking and/or cooling of the product is made difficult, the latter getting dirty very easily.

Some of the drawbacks set forth are solved by Spanish patent application P200602733 of the same applicant as the present invention. In the machine described in said application, a casing in which the foods are treated internally comprises at least two thermally conditioned walls and at least one blade moving tightly between both walls. The ratio between the volume of the casing and the thermally treated surface thus increases, simulating traditional cooking instruments.

However, this machine has the drawback that not all the wall is scraped, particularly the upper end of the conditioned thermally wall, as well as the fact that all the elements for the heat treatment of foods must be made in a block, a modular assembly thereof not being possible.

BRIEF SUMMARY OF THE INVENTION

The invention relates to a machine for heat exchange with a product comprising a vat, with a first end, a second end and an outer surface, for containing the product to be treated, a shaft, at least one element for heating or cooling the product and for being coupled in the shaft and at least one scraper blade. Said scraper blade will be located tightly between two elements in order to scrape the surface of the elements and thus detach the adhered product.

Throughout the present invention, heat exchange will include all those processes in which there is a heat transfer from or towards the product. It therefore includes mere cooling or heating, as well as drying or evaporation processes also. With regard to the products to be treated, they will typically be foods, in which the machine of the invention allows simulating traditional cooking given that the ratio between heated area and volume of the vat is close to traditional pans, but will also be applicable in any other type of product which needs to be heated or cooled, such as for example sludge from waste water purification plants.

According to the invention, said machine additionally comprises a plurality of separators configured to be coupled in the shaft, at least one separator being located between two contiguous elements.

The present machine for heat exchange with a product is a modular machine, given that both the elements and the separators may be coupled to the shaft to thus give rise to the structure for heating or cooling the products. Depending on the space needs or on the cooking requirements, the space between elements may be increased by adding new separators between said elements. Additionally, it is possible to appropriately modify the vat volume and thermally conditioned surface ratio with said flexible configuration.

The vat will be able to have a cylindrical configuration, for example. The shaft of said cylinder will then be the shaft of the machine for heat exchange with a product. Although this embodiment is not the only one, it is the preferred embodiment given the existence of the elements rotating about a shaft.

The elements may be made in a cylindrical shape, so that they have a first base, a second base, a cylindrical surface defining their contour and a shaft. Said shaft will coincide with the shaft of the machine for heat exchange with a product.

The separators may comprise a first conduit and a second conduit for the circulation of a fluid. Said fluid may supply heat to the vat or may remove it therefrom, depending on whether the product must be heated or cooled. Both conduits will be parallel to the shaft of the machine for heat exchange with a product, the fluid thus being channeled in the direction of said shaft.

The elements may comprise a first conduit for connecting to the first conduit of at least one separator, and a second conduit for connecting to the second conduit of at least one separator. The fluid, led in the direction of the shaft by the separators, is transported to the elements through two conduits in each of the elements. Said conduits will correspond to a inlet conduit for the fluid and another outlet conduit for the fluid. A circulation of the fluid will be created inside the actual element such that the element will be heated or cooled in order to be able to heat or cool the product.

The machine may include at least one U-shaped structure, typically three structures placed at 120°, said structure being formed by a first batten anchored in a first end of the shaft of the machine for heat exchange with a product perpendicular to said shaft and a second batten anchored in a second end of the shaft of the machine for heat exchange with a product perpendicular to said shaft. Said first and second batten will be joined by means of a stringer. In said structure, through its stringer, at least one inner scraper blade will be joined. Said inner scraper blades will be located between a first element and a second element, both elements being contiguous to one another. Thus, the structure, which is an outer structure in relation to the elements and to the separators, since it can have a relative rotation in relation to the elements and separators and since it has at least one inner scraper blade joined thereto, may clean the elements and the separators when this relative rotation movement is performed.

The inner scraper blades may be U-shaped, with a first vertical crosspiece, a second vertical crosspiece and a horizontal crosspiece. A first flange may emerge vertically and towards the outside of the scraper blade at the upper end of the first vertical crosspiece. Likewise, a second flange may emerge vertically and towards the outside of the scraper blade at the upper end of the second vertical crosspiece.

These elements have been designed so that the scraper blade can clean the elements and separators, while at the same time it allows stirring or mixing the product contained in the vat. Therefore, the horizontal crosspiece will be in contact with the separators, the first horizontal crosspiece with the first base of one of the elements, the second horizontal crosspiece with the second base of the other one of the elements, the first flange with the cylindrical surface of an element and the second flange with the cylindrical surface of the element contiguous to the previous one. As all the surfaces of contact of the elements and separators with the product are thus arranged, all these devices will be scraped and cleaned of the possible product remains adhered in said separators, bases and cylindrical surfaces. Said product will be additionally stirred in the same way as a spoon, for example, does so in a pan.

With these inner scraper blades the inner surface of the vat is not scraped. For this reason, the machine for heat exchange with a product may include for this purpose in the at least one U-shaped structure an outer scraper blade in relation to the U-shaped structure. Said outer scraper blade will have a first crosspiece parallel to the first batten and anchored to the shaft of the machine for heat exchange with a product, a second crosspiece parallel to the second batten and anchored to the shaft of the machine for heat exchange with a product, said first crosspiece and second crosspiece being joined by a horizontal crosspiece parallel to the stringer. Thus, the first crosspiece may scrape the first end of the vat, the second crosspiece may scrape the second end of the vat and the outer surface of the vat with the horizontal crosspiece.

The shaft may comprise two types of bearings, first bearings allowing the scraper blades to rotate, and second bearings allowing the vat to rotate. Thus, in a first position, the food or product to be treated may be introduced through an opening made in the outer surface of the vat. Once the food or product has been treated, the vat may be rotated and positioned in a second position, such that when the previously mentioned opening is opened, the treated food or product may be unloaded from the vat.

DESCRIPTION OF THE DRAWINGS

To complement the description which is being made and with the aim of aiding to better understand the features of the invention, a set of drawings is attached as an integral part of said description, in which the following has been shown with an illustrative and non-limiting character.

DETAILED DESCRIPTION OF THE INVENTION

A preferred embodiment of the machine for heat exchange with a product forming the object of this invention is described below with reference to the figures.

Figure 1:
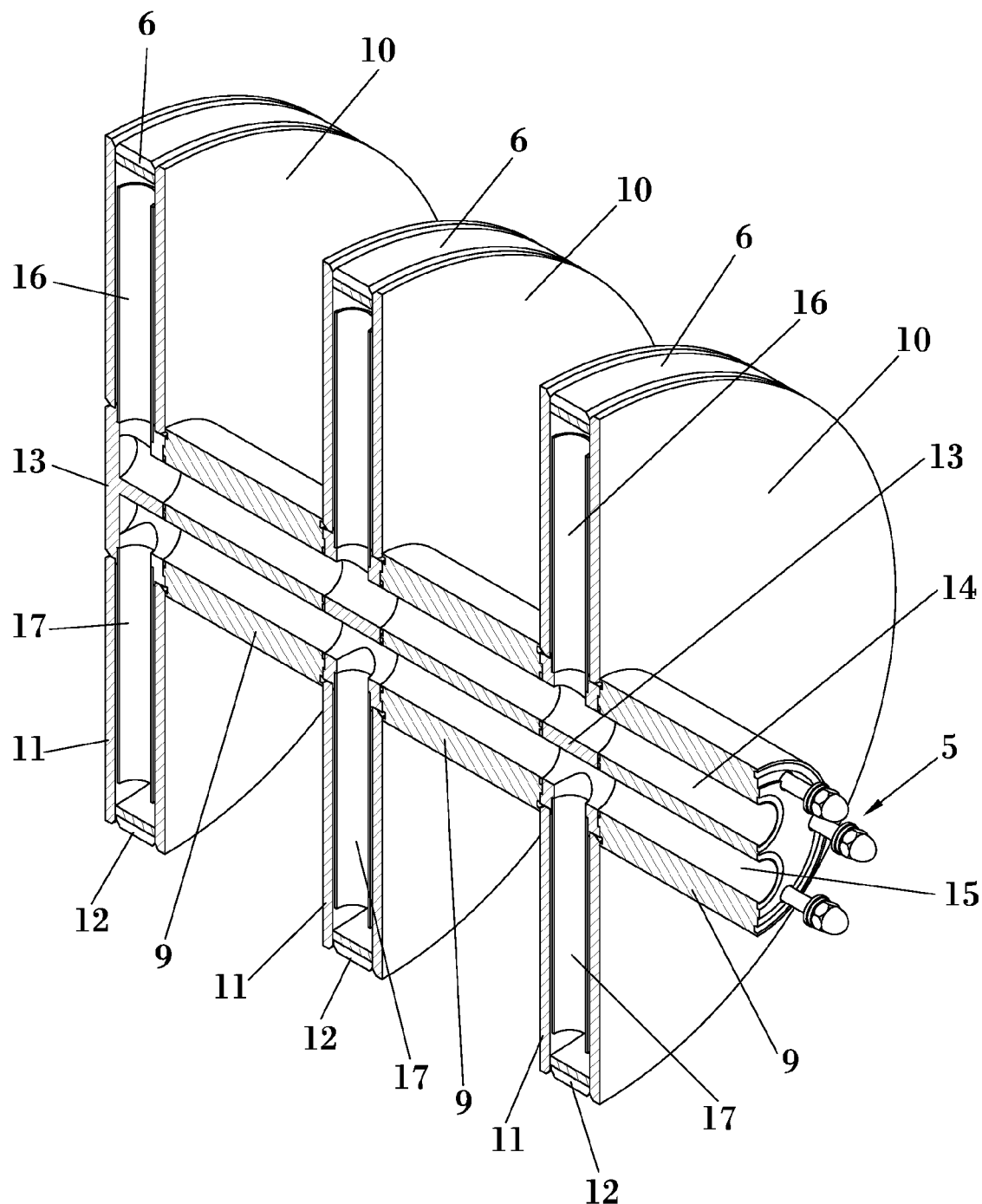
FIG. 1 shows a perspective view sectioned according to a vertical plane of a joining of three elements and separators according to the present invention.

FIG. 1 shows a perspective view sectioned according to a vertical plane of an assembly of three elements (6) and three separators (9). This assembled could be enlarged with as many separators (9) as elements (6) were necessary, for the purpose of being adjusted to the requirements of the machine, either size or volume/surface ratio requirements. Likewise, more than one separator (9) could be located between two contiguous elements (6).

As can be observed in the figure, each element (6) has a cylindrical configuration, with a first base (10), a second base (11) and a cylindrical surface (12). The separator (9) may also have a cylindrical configuration. Both the shaft (13) of the element (6) and the shaft of the separator (9) will coincide with the shaft (5) of the machine. Following a path parallel to said shaft (5), the separator (9) will comprise two conduits (14, 15), a first inlet conduit (14) for a fluid and a second outlet conduit (15) for said fluid. Said conduits (14, 15) of the separator (9) will be communicated with first conduits (16) and second conduits (17) of elements (6). The fluid coming from the first conduit (14) of a separator (9) will enter the element (6) through its first conduit (16) to circulate through the element (6) and exit through its second conduit (17). The fluid in this circulation may transfer or absorb heat for heating or cooling the product contained in the vat (1) of the machine.

Figure 2:
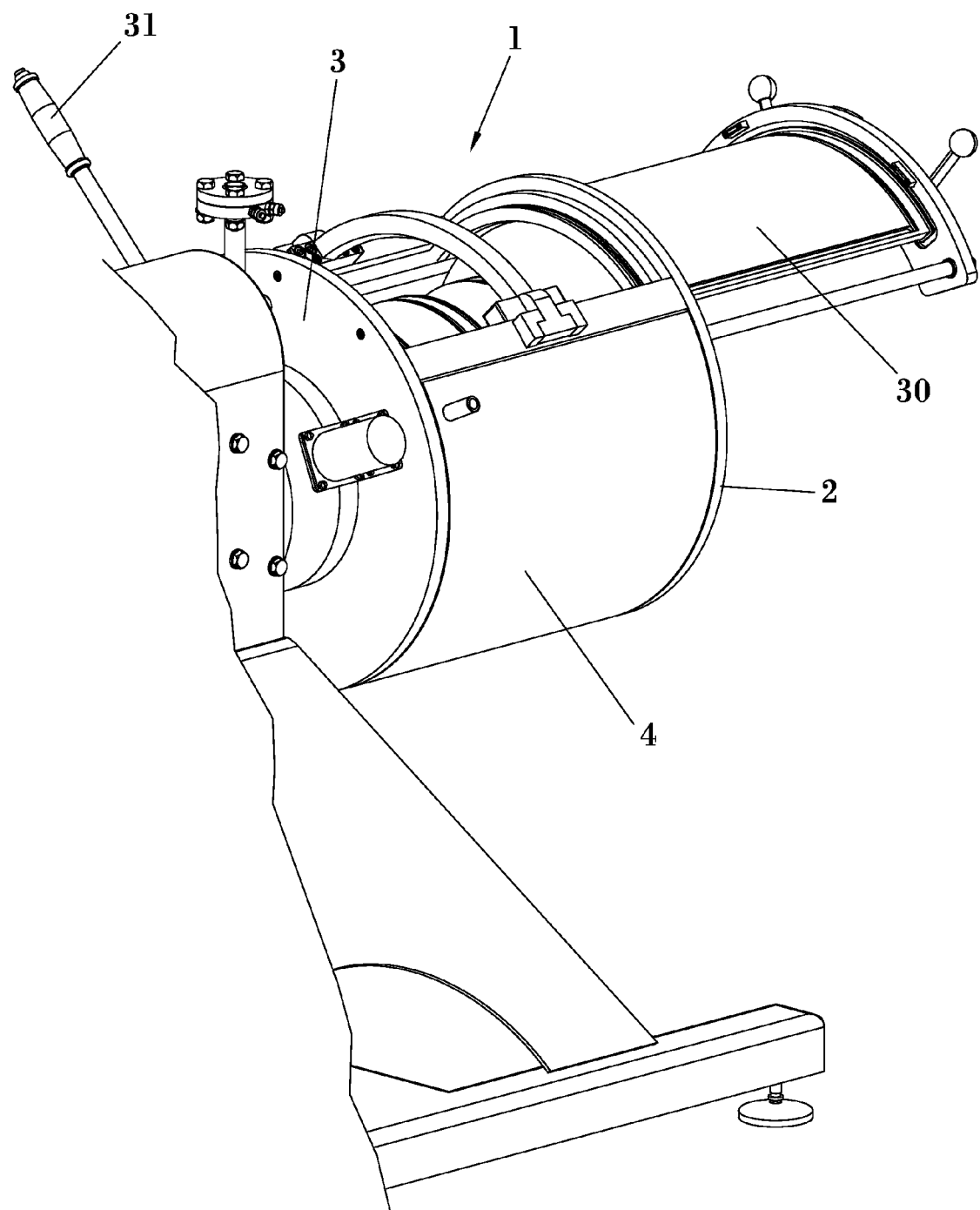
FIG. 2 shows a perspective view of the machine, showing the vat with the holes made for fixing the shaft and for connecting the first and second conduit of the separators, as well as the lid of the opening made in the open outer surface, said opening being ready for receiving the food or product to be treated from a supply point located above the machine.

The vat (1) of the machine can be observed in FIG. 2. Said vat (1), like the elements (6), has a cylindrical configuration, with a first end (2), a second end (3) and an outer surface (4). The shaft of the cylinder of the vat (1) will also coincide with the shaft (5) of the machine for heat exchange with a product, with the shaft (13) of the elements and with the shaft of the separators (9). The vat has an opening which is covered with a lid (30). Said lid (30) can slide in rest situations of the vat (1), such that it allows the access to the inside of the vat (1). In the position shown in FIG. 2, the vat (1) can be filled with food or product to be treated from a supply point located above the vat. Once the food or product has been introduced inside the vat (1), the lid (30) will close the vat (1), its treatment being able to be carried out. In this sense, it must be mentioned that the shaft (5) comprises two systems of bearings, first bearings allowing the scraper blades (7, 8) to rotate, and second bearings allowing the vat (1) to rotate. During the process for treating the product, the second bearings remain fixed, such that the motor driving the machine only moves the scraper blades (7, 8). The motor will be fixed to the vat (1) through two electric latches, for example.

Figure 3:
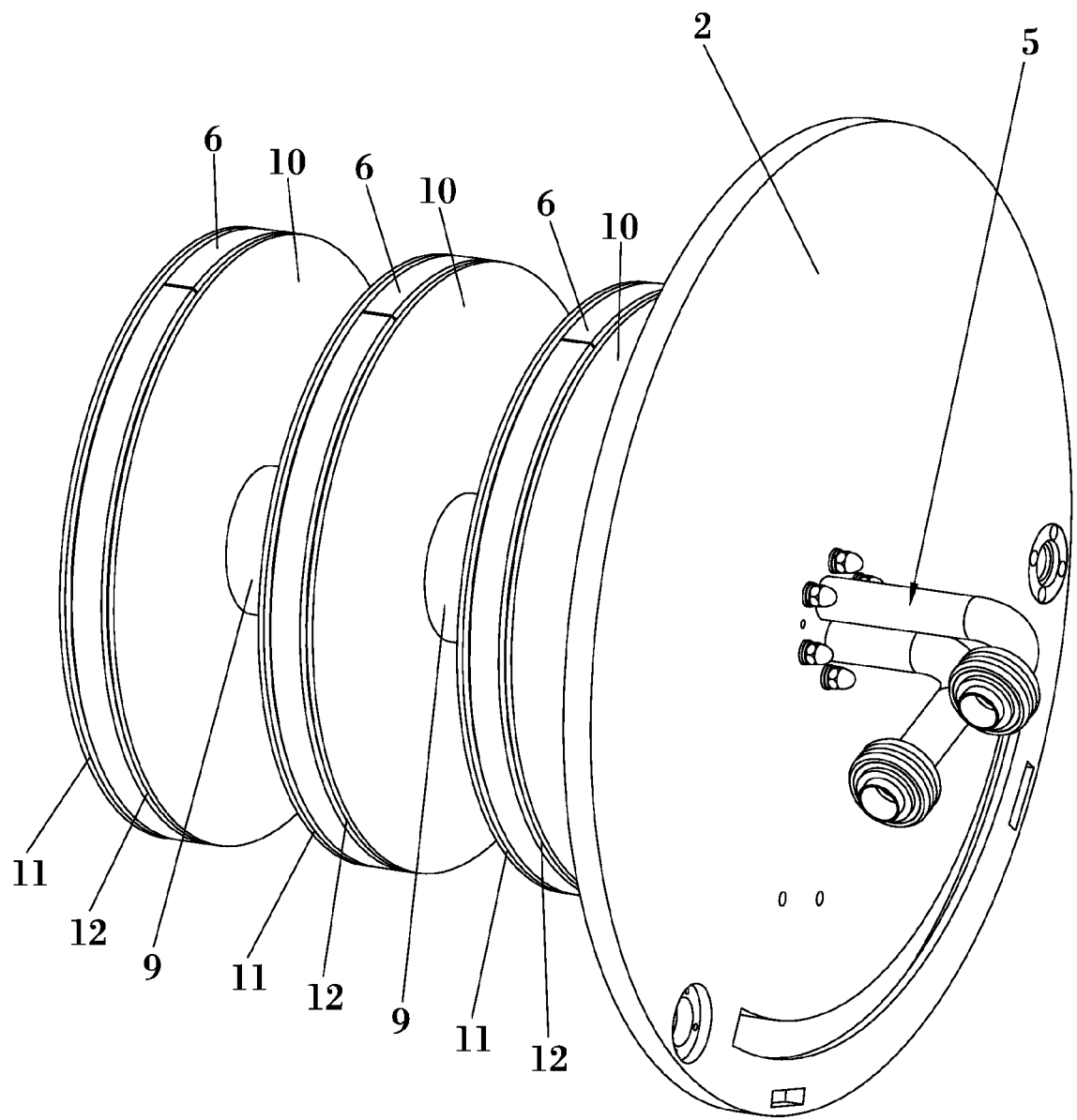
FIG. 3 shows a perspective view of the three elements and separators of FIG. 1 connected by the shaft of the machine and the first and second conduit connected.

By way of clarification, a partial view of the machine is shown in FIG. 3, in which the three elements (6) and three separators (9) are shown joined to the shaft (5) of the machine formed, in this case and by way of example, by six rods passing through the three elements (6) and separators (9), fixed through a threaded joint in the first end (2) and the second end (3) of the vat (1). Depending on the number of elements and separators and of the torque to be transmitted, the number of threaded rods can be increased or reduced. Likewise, the two pipes communicating with the first conduits (14, 16) and second conduits (15, 17) of elements (6) and separators (9) are shown. The fluid for cooling or heating the product will be led from an external device, not shown, to the machine through these two pipes.

Figure 4:
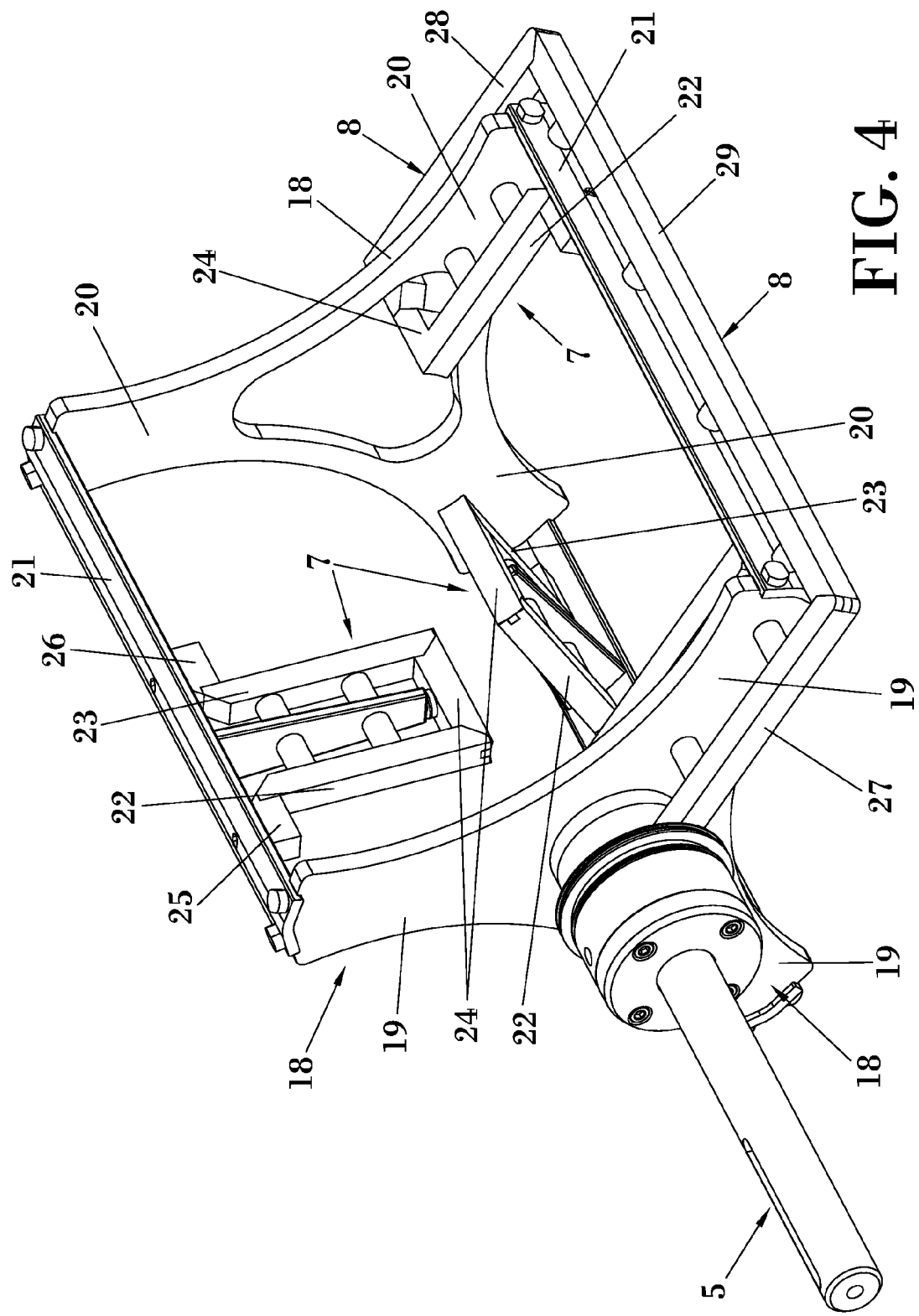
FIG. 4 shows a perspective view of the U-shaped structures, with three of these structures joined to the shaft, each of them with a scraper blade and a fourth additional outer scraper blade.
Figure 5:
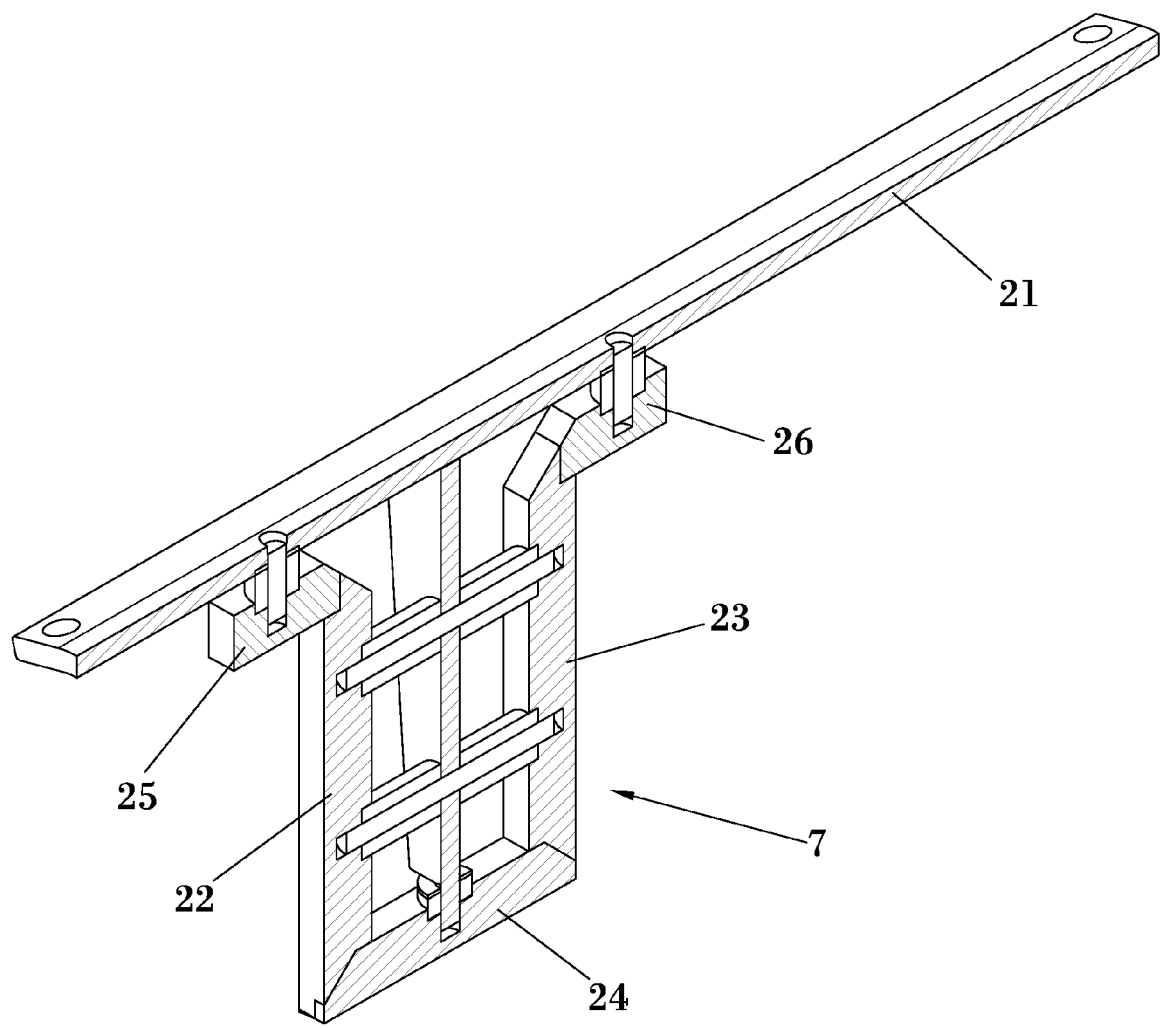
FIG. 5 shows a detailed perspective view sectioned according to a vertical plane of a scraper blade and its joining to the stringer of the structure.

FIG. 4 shows the structures (18) joined to the shaft (5) of the machine in which the blades for scraping the elements (6) and separators (9), and the first end (2), the second end (3) and the outer surface (4) of the vat (1) are fixed. Three structures (18) that are equally distributed, each of them at 120°, can be seen in the embodiment shown in the figure.

Each structure (18) is U-shaped, with a first batten (19), a second batten (20) and a stringer (21) joining said battens (19, 20). The first batten (19) will be fixed at one of its two ends perpendicularly in a first end of the shaft (5) of the machine for heat exchange with a product. Likewise, the second batten (20) will be fixed at one of its two ends perpendicularly in a second end of the shaft (5) of the machine for heat exchange with a product. The batten (21) will be joined to the first and second battens (19, 20) at its two free ends.

Inner or outer scraper blades (7, 8) are fixed to these structures (18). FIG. 4 shows two inner blades (7) joined to two structures (18) and an outer blade (8) joined to the third structure (18).

Each inner scraper blade (7) is U-shaped with a first vertical crosspiece (22), a second vertical crosspiece (23) and a horizontal crosspiece (24) joining said first and second vertical crosspieces (22, 23). Each inner scraper blade (7) additionally has a first flange (25) and a second flange (26). Said flanges (25, 26) emerge towards the outside of the inner scraper blade (7) at the free ends of the first and second vertical crosspiece (22, 23). The joining of the inner scraper blade (7) to the stringer (21) of the structure (18) is carried out through the first and second flange (25, 26), additionally being able to be carried out through a rib joined to the stringer (21) and to the first and second vertical crosspiece (22, 23) of the inner scraper blade (7).

Figure 6:
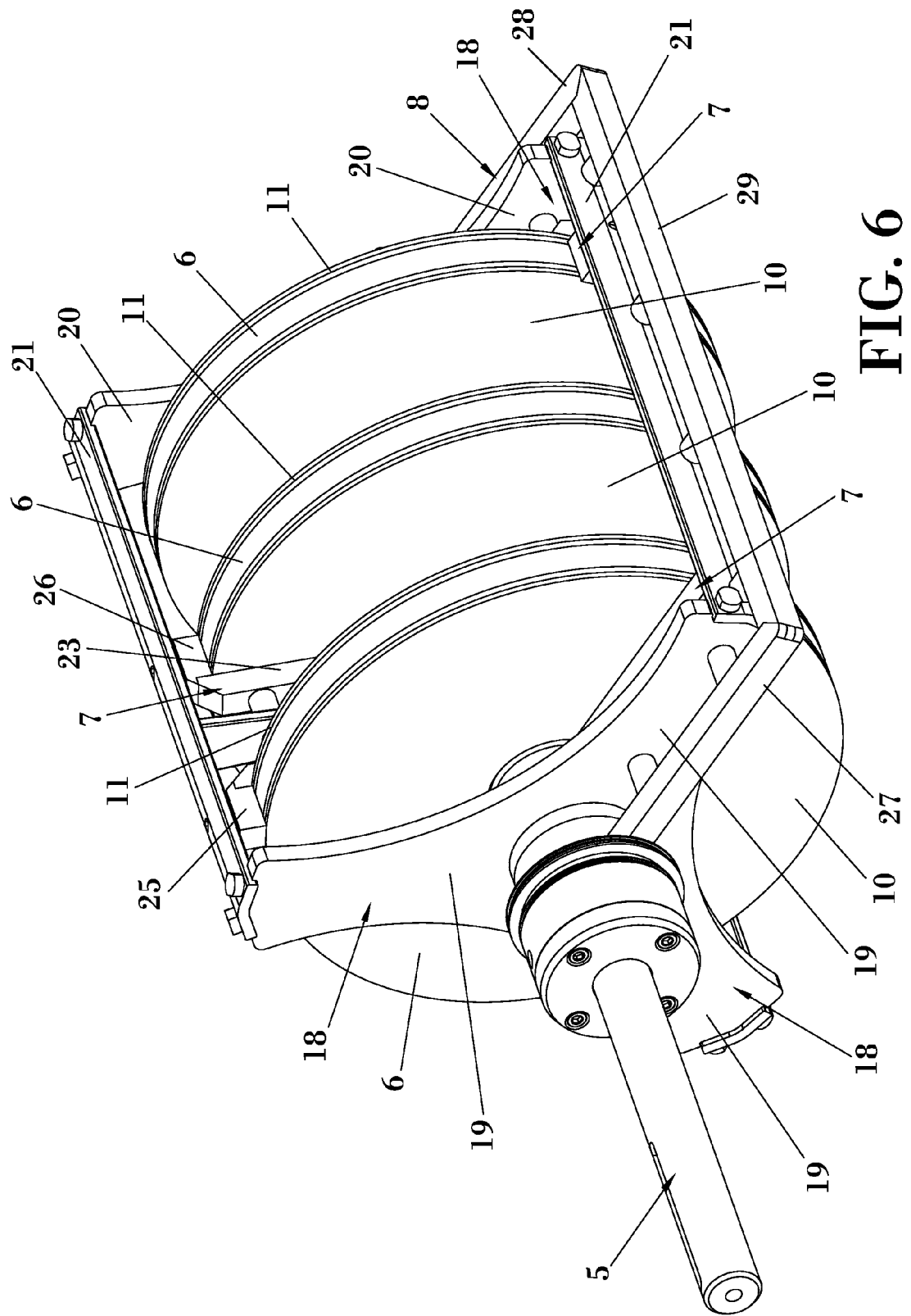
FIG. 6 shows a perspective view of the assembly of the elements, separators, structure and scraper blades.
Figure 7:
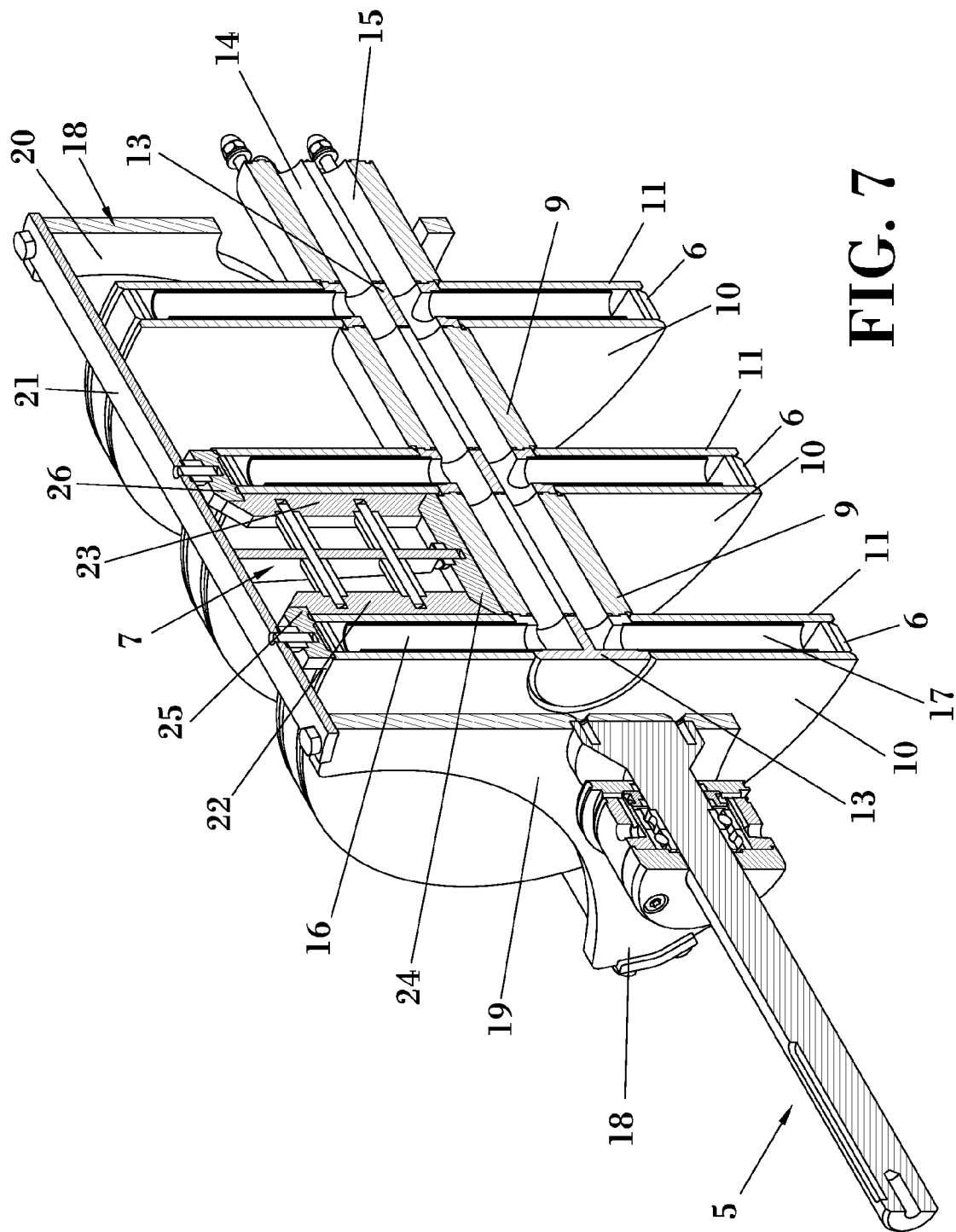
FIG. 7 shows a perspective view sectioned according to a vertical plane in which the contact between the scraper blade with the separator and element can be observed.

The inner arrangement of a machine for heat exchange with a product with three elements (6) is shown in FIG. 6, in which the elements (6) mentioned in FIG. 1 and the structures (18) mentioned in FIG. 4 are observed. As can be observed, as there is a relative movement between the elements (6)—separators (9) and the structures (18), the inner blades (7) will scrape the walls of the elements (6) and separators (9). In particular, the first and second crosspiece (22, 23) of the inner scraper blade (7) will scrape the first base (10) of an element (6) and the second base (11) of a contiguous element (6), the cylindrical surfaces (12) being scraped by the first and second flanges (25, 26) of the inner scraper blades (7). The horizontal crosspieces (24) will scrape the outer surfaces of the separators (9). All this is shown with greater detail in FIG. 7.

An outer scraper blade (8) can also be seen in FIG. 6. Said outer scraper blade (8) is also U-shaped with a first vertical crosspiece (27), a second vertical crosspiece (28), both joined perpendicularly to the shaft (5) of the machine for heat exchange with a product, parallel to the first and second battens (19, 20) of the structure (18) and outside said structure (18). Said first vertical crosspiece (27) and second vertical crosspiece (28) are joined, parallel to the stringer (21) of the structure (18) and outside said structure (18), through a horizontal crosspiece (29). The first vertical crosspiece (27), the second vertical crosspiece (28) and the horizontal crosspiece (29) of the outer scraper blade (8) will carry out the same function as the first vertical crosspiece (22), the second vertical crosspiece (23) and the horizontal crosspiece (24) of the outer scraper blade (7) scraping, respectively, the first end (2), the second end (3) and the outer surface (4) of the vat (1) when the structure rotates about the shaft (5) of the machine for heat exchange with a product. The number of these outer scraper blades (8) may be at most equal to the number of structures (18).

Figure 8:
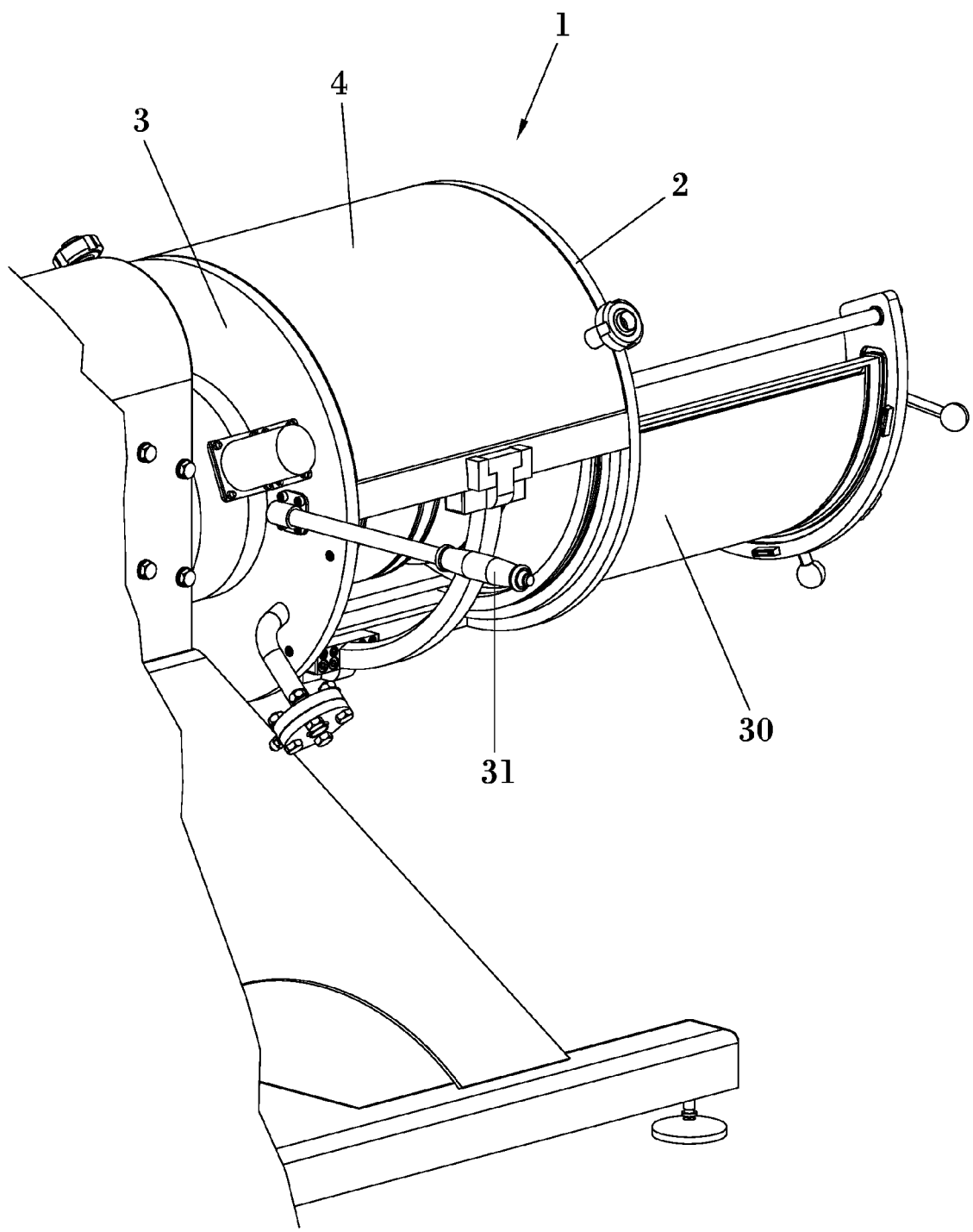
FIG. 8 shows a perspective view of the machine, showing the vat in an unloading position, with the opening ready for dispensing the treated food or product to a container located under the vat.

FIG. 8 shows the end of the process for treating the product or food. Once the process has ended, the motor of the vat (1) is decoupled, for example by opening the previously mentioned electric latches. In this position, by applying a force on the bar (31) the vat (1) can be rotated and the opening thereof can be oriented towards the storage tank or container in which the treated product or food will be dumped. At this time, the lid (30) may be opened, the product or food falling into the container located under the vat (1) arranged for such purpose. During the unloading process, the movement of the vat (1) may be blocked again for the purpose of preventing the movement thereof during the unloading operation. This blocking may also occur also by means using the mentioned electric latches.

For the purpose of facilitating the transfer of the product or food from the vat (1) to the storage tank or container, a guiding system may be added to the machine, such that the losses or wastages in the unloading process are minimized. Said guiding system may be a ramp, for example.

In view of this description and set of figures, the person skilled in the art will be able to understand that the invention has been described according to a preferred embodiment thereof, but that multiple variations can be introduced in said preferred embodiment, without departing from the object of the invention as it has been claimed.

The invention claimed is:

1. A machine for heat exchange with a product comprising:
   a vat, with a first end, a second end and an outer surface, for containing the product to be treated,
   a machine shaft adjacent at least one end of said vat,
   at least two elements for heating or cooling a product and for being coupled to the machine shaft,
   a plurality of separators configured to be coupled to the machine shaft,
   at least one separator being located between the at least two elements, the at least two elements and the plurality of separators forming a body fixed to one of the first end and the second end, and
   a plurality of scraper blades disposed between the at least two elements and between the body and an inner surface of the vat configured to scrape a total surface area of heat exchange, wherein the plurality of scraper blades are mounted on a rotating structure driven by a motor fixed to the other of the first end and the second end.

2. A machine for heat exchange with a product according to claim 1, wherein the vat has a cylindrical configuration, a cylinder shaft coinciding with the machine shaft for heat exchange with a product.

3. A machine for heat exchange with a product according to claim 1, wherein the at least one element has a cylindrical shape, with a first base, a second base, a cylindrical surface and an element shaft, the element shaft coinciding with the machine shaft for heat exchange with a product.

4. A machine for heat exchange with a product according to claim 1, wherein the separators comprise a first conduit and a second conduit for the circulation of a fluid, the first conduit and the second conduit being parallel to the machine shaft for heat exchange with a product.

5. A machine for heat exchange with a product according to claim 4, wherein the at least two elements comprises a first conduit for connecting to a first conduit of at least one separator, and a second conduit for connecting to a second conduit of at least one separator.

6. A machine for heat exchange with a product according to claim 1, further comprising at least one U-shaped structure with a first batten anchored in a first end of the machine shaft for heat exchange with a product perpendicular to said shaft and a second batten anchored in a second end of the machine shaft for heat exchange with a product perpendicular to said machine shaft, said first and second battens being joined by means of a stringer, at least one inner scraper blade of the plurality of scraper blades being joined to said stringer.

7. A machine for heat exchange with a product according to claim 6, wherein the at least one inner scraper blade is located between a first element and an adjacent second element.

8. A machine for heat exchange with a product according to claim 7, wherein the at least one inner scraper blade is U-shaped, with a first vertical crosspiece, a second vertical crosspiece and a horizontal crosspiece, with a first flange emerging vertically and towards the outside of the inner scraper blade at the upper end of the first vertical crosspiece and with a second flange emerging vertically and towards the outside of the inner scraper blade at the upper end of the second vertical crosspiece, the horizontal crosspiece being in contact with the at least one separator, the first horizontal crosspiece being in contact with a first base of the first element, the second horizontal crosspiece being in contact with a second base of the second element, the first flange being in contact with the cylindrical surface of the first element and the second flange being in contact with the cylindrical surface of the second element, to scrape the product adhered in said separators, bases and cylindrical surfaces.

9. A machine for heat exchange with a product according to claim 6, wherein the at least one U-shaped structure comprises an outer scraper blade of the plurality of scraper blades in relation to the U-shaped structure with a first crosspiece parallel to the first batten and anchored to the machine shaft for heat exchange with a product, a second crosspiece parallel to the second batten and anchored to the machine shaft for heat exchange with a product, said first crosspiece and second crosspiece being joined by a horizontal crosspiece parallel to the stringer, said outer scraper blade being configured to scrape the first end of the vat with the first crosspiece, the second end of the vat with the second crosspiece and the outer surface of the vat with the horizontal crosspiece.

10. A machine for heat exchange with a product according to claim 6, further comprising three U-shaped structures separated 120°.

11. A machine for heat exchange with a product according to claims 1-10, further comprising means for rotating the vat about the shaft.

12. A machine for heat exchange with a product according to claim 1, wherein a product is a food.

* * * * *